US008918904B2

(12) United States Patent
Sanin et al.

(10) Patent No.: US 8,918,904 B2
(45) Date of Patent: Dec. 23, 2014

(54) SYSTEMS AND METHODS FOR USER IDENTITY VERIFICATION AND RISK ANALYSIS USING AVAILABLE SOCIAL AND PERSONAL DATA

(75) Inventors: Aleksey Sanin, Sunnyvale, CA (US);
William D. Clerico, Palo Alto, CA (US);
Richard Aberman, Palo Alto, CA (US);
Eric Stern, East Palo Alto, CA (US);
Khang Tran, San Jose, CA (US)

(73) Assignee: Wepay, Inc., Palo Alto, CA (US)

( * ) Notice: Subject to any disclaimer, the term of this patent is extended or adjusted under 35 U.S.C. 154(b) by 175 days.

(21) Appl. No.: 13/300,876

(22) Filed: Nov. 21, 2011

(65) Prior Publication Data

US 2012/0159647 A1    Jun. 21, 2012

Related U.S. Application Data

(60) Provisional application No. 61/424,394, filed on Dec. 17, 2010.

(51) Int. Cl.
| | |
|---|---|
| G06F 21/00 | (2013.01) |
| G06Q 50/00 | (2012.01) |
| H04L 12/58 | (2006.01) |
| G06Q 20/40 | (2012.01) |
| G06Q 30/02 | (2012.01) |
| H04L 29/08 | (2006.01) |
| H04L 29/06 | (2006.01) |

(52) U.S. Cl.
CPC .............. *G06Q 50/01* (2013.01); *H04L 51/32* (2013.01); *G06Q 20/4014* (2013.01); *G06Q 20/4016* (2013.01); *G06Q 30/0225* (2013.01); *H04L 67/20* (2013.01); *H04L 63/1416* (2013.01)
USPC ...... 726/28; 726/2; 726/26; 726/19; 715/747; 713/183; 705/38

(58) Field of Classification Search
CPC ...... H04L 51/32; H04L 63/1416; H04L 67/20
USPC ........................... 726/28, 2, 26, 19; 715/747; 713/182–183; 705/7.28, 75, 7.15, 38
See application file for complete search history.

(56) References Cited

U.S. PATENT DOCUMENTS

| | | | | |
|---|---|---|---|---|
| 8,250,096 | B2 * | 8/2012 | Su et al. ........................ | 707/783 |
| 8,380,709 | B1 * | 2/2013 | Diller et al. ................... | 707/723 |

(Continued)

OTHER PUBLICATIONS

Dongsheng, Zhai; "A social network based trust model for e-commerce"; Wireless Communications, Networking and Mobile Computing, 2008. WiCOM '08. 4th International Conference on; DOI: 10.1109/WiCom.2008.2144 Publication Year: 2008 , pp. 1-5.*
Fengming, Liu; "Social network-based trust computing in P2P environments";Intelligent Control and Automation, 2008. WCICA 2008. 7th World Congress on; DOI: 10.1109/WCICA.2008.4593253 Publication Year: 2008 , pp. 2130-2135.*

*Primary Examiner* — Harunur Rashid
*Assistant Examiner* — Angela Holmes
(74) *Attorney, Agent, or Firm* — Duane Morris LLP

(57) ABSTRACT

A new approach is proposed that contemplates systems and methods to support user identity verification based on social and personal information of the user. Under the approach, customers/users are required to grant identity verifying party a degree of access to their social network information, including but not limited to, account data and social graph information on social networks. The identity verifying party then acquires information of a current or potential user's online presence in addition to other information of the user and utilizes such information to verify the user's identity in the real world and/or to assess the fraud risk of a specific financial transaction requested by the user.

27 Claims, 4 Drawing Sheets

(56) References Cited

U.S. PATENT DOCUMENTS

2009/0265639 A1* 10/2009 Shuster .................. 715/747
2010/0100398 A1* 4/2010 Auker et al. .............. 705/4
2011/0093474 A1* 4/2011 Etchegoyen ............ 707/748
2011/0137789 A1* 6/2011 Kortina et al. ........... 705/38

* cited by examiner

SYSTEMS AND METHODS FOR USER IDENTITY VERIFICATION AND RISK ANALYSIS USING AVAILABLE SOCIAL AND PERSONAL DATA

RELATED APPLICATIONS

This application claims priority to U.S. Provisional Patent Application No. 61/424,394, filed Dec. 17, 2010, and entitled "Systems and methods for user identity verification and risk analysis using available social and personal data," and is hereby incorporated herein by reference.

BACKGROUND

Ecommerce sites, especially those facilitating online payments between users (peer-to-peer payments and money transmitter businesses), as well as credit card processing companies, struggle to verify the identity of their customers. Traditional methods generally include collecting basic personal identifying information from customers, including name, address, social security number and phone number, and cross referencing this data with publicly and privately available databases to ensure that customers are who they say they are. More sophisticated e-commerce businesses will generate "reputation scores" or "risk scores" based on the data they have aggregated regarding particular users. Some businesses use third-parties that specialize in creating these reputation scores based on a variety of publicly and privately available data, including companies (such as Rapleaf) that use membership in certain online social networks and web services as data points.

Web-based businesses will often accumulate additional data about their customers, including machine fingerprints, usage patterns, IP address, history, etc., which they plug into a rules engine—a middleware application that allows the creation and prioritization of rules to be used in managing fraud. These engines allow merchants to create rules that will help evaluate orders and transactions as they come in. The rules engine can have many different names, such as "decision software," "management software" or "order management." Most payment and order management systems will have some of the capabilities to build and apply rules.

As fraudsters become more and more sophisticated, traditional methods of protecting businesses against fraud, identity theft, terrorism and money laundering are becoming increasingly ineffective. Even robust rules engines and reputation scores based on large amounts of user data do not adequately protect businesses from the risks associated with fraud.

The foregoing examples of the related art and limitations related therewith are intended to be illustrative and not exclusive. Other limitations of the related art will become apparent upon a reading of the specification and a study of the drawings.

DETAILED DESCRIPTION OF EMBODIMENTS

The approach is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

A new approach is proposed that contemplates systems and methods to support user identity verification based on social and personal information of the user. Under the approach, customers/users are required to grant identity verifying party a degree of access to their social network information, including but not limited to, account, data and social graph information on the social networks. The identity verifying party then acquires information of a current or potential user's online presence in addition to other identifying information of the user and utilizes such information to verify the user's identity in the real world and/or to assess the fraud risk of a specific financial transaction requested by the user.

Although fraudsters have become better at making fraudulent transactions look valid (by stealing personal identification information and building trust/reputation over time), the proposed new approach utilizes social network information of a user that has only recently become available. Because of its multi-party nature, this newly available social network information allows for far more effective methods of verifying identity of the user and measuring risk of a financial transaction.

Figure 1:
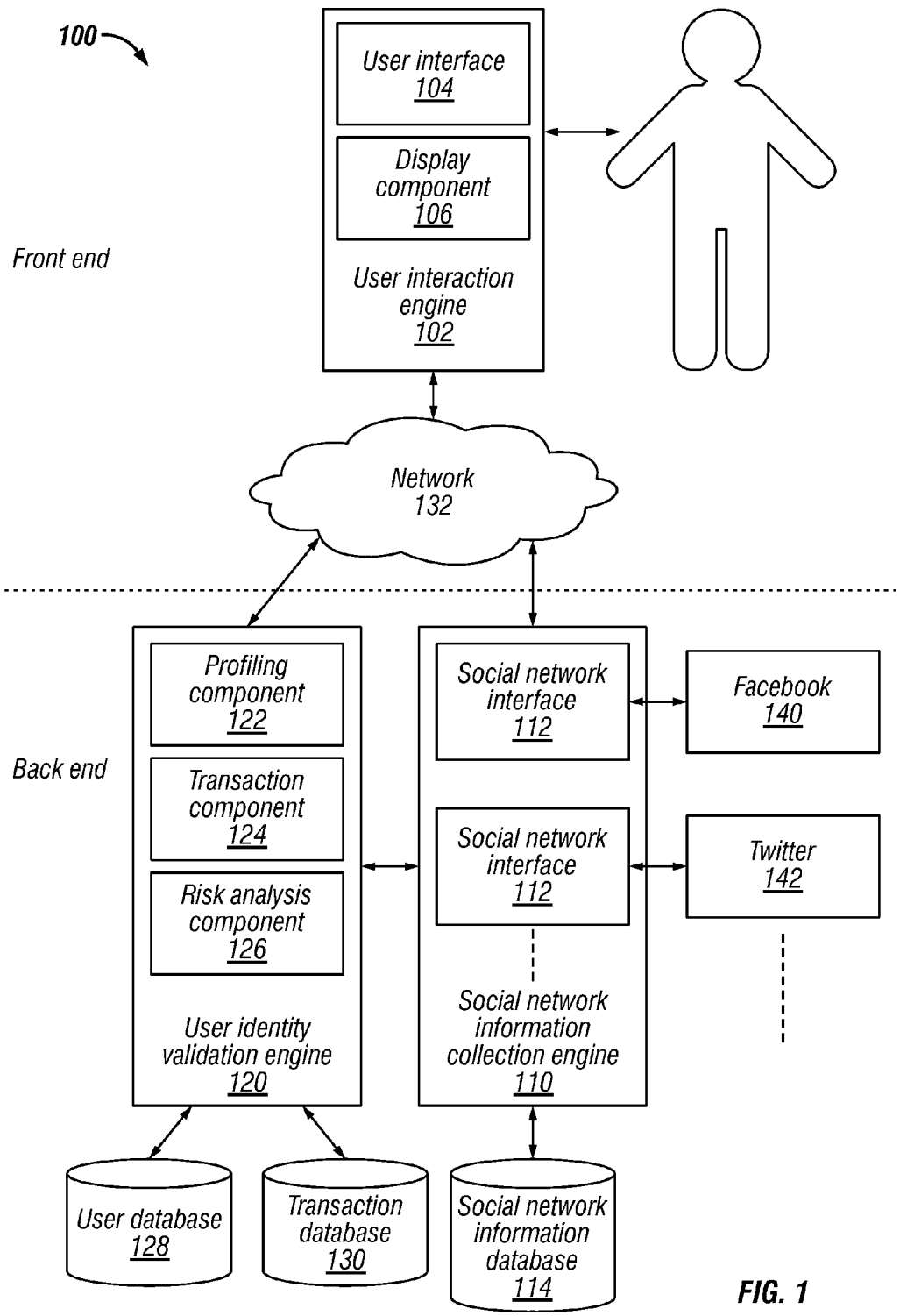
FIG. 1 depicts an example of the core architecture to support user identity verification based on the social network information of the user.

FIG. 1 shows an example of the core architecture to support user identity verification based on the social network information of a user. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the system 100 includes on the front end a user interaction engine 102, which includes at least a user interface 104, and a display component 106. On the back end, the system 100 includes a social network information collection engine 110, which includes a plurality of social network interfaces 112, each coupled to a API or controller of a specific social networking site, such as Facebook 140 or Twitter 142; a social network information database 114 coupled to the social network information collection engine 110; and a user identity validation engine 120, which includes at least a profiling component 122, a transaction component 124, and a risk analysis component 126; a user database 128 and a transaction database 1230 coupled to the user identity validation engine 120.

As used herein, the term engine refers to software, firmware, hardware, or other component that is used to effectuate a purpose. The engine will typically include software instructions that are stored in non-volatile memory (also referred to as secondary memory). When the software instructions are executed, at least a subset of the software instructions is loaded into memory (also referred to as primary memory) by a processor. The processor then executes the software instructions in memory. The processor may be a shared processor, a dedicated processor, or a combination of shared or dedicated processors. A typical program will include calls to hardware components (such as I/O devices), which typically requires the execution of drivers. The drivers may or may not be considered part of the engine, but the distinction is not critical.

As used herein, the term database is used broadly to include any known or convenient means for storing data, whether centralized or distributed, relational or otherwise.

In the example of FIG. 1, each of the engines and databases can run on one or more hosting devices (hosts). Here, a host can be a computing device, a communication device, a storage device, or any electronic device capable of running a software component. For non-limiting examples, a computing device can be but is not limited to a laptop PC, a desktop PC, a tablet PC, an iPod, an iPhone, a PDA, or a server machine. A storage device can be but is not limited to a hard disk drive, a flash memory drive, or any portable storage device. A communication device can be but is not limited to a mobile phone.

In the example of FIG. 1, the user interaction engine 102, the social network information collection engine 110, and the user identity validation engine 120 each has a communication interface (not shown), which is a software component that enables the engines to communicate with each other following certain communication protocols, such as TCP/IP protocol. The communication protocols between two devices are well known to those of skill in the art.

In the example of FIG. 1, the network 132 enables the engines to communicate and interact with each other. Here, the network 132 can be a communication network based on certain communication protocols, such as TCP/IP protocol. Such network can be but is not limited to, internet, intranet, wide area network (WAN), local area network (LAN), wireless network, Bluetooth, WiFi, and mobile communication network. The physical connections of the network and the communication protocols are well known to those of skill in the art.

In the example of FIG. 1, the user interaction engine 102 is configured to enable a user to interact with a service provider by logging in and submitting a request for service or (financial) transaction to the service provider (user identity verification engine 120 as discussed later) via user interface 104 and to present to the user status of the request and/or processing result of the transaction by the service provider via the display component 106. In some embodiments, the user interaction engine 102 also enables the user to provide identifying information or other relevant information to the service provider in order to establish his/her user profile for the purposes of verification of his/her identity and assessing the risk of the transaction requested. In some embodiments, in addition to serve the user requesting a service or transaction, the user interaction engine 102 also enables a risk assessment agent to access the profiled and/or risk assessment information of the user and/or request additional information from the user via user interface 104 in order to determine whether the transaction requested should be granted or denied. In some embodiments, the user interface 104 can be a Web-based application or interface, which allows the user to access the system 100 remotely via the network 132.

In the example of FIG. 1, the social network information collection engine 110 collects social network information of the user that are publicly available from various social networks, which host a variety of data related to the user, via corresponding social network interfaces 112. Here, the social networks include but are not limited to, Facebook, Twitter, Google+, LinkedIn, Classmates.com, Disqus, MySpace, Blippy, Dailybooth, Bump, Bing, Quora, eBay, Yahoo!, Plaxo, Friendster, Flickr, Amazon, Digg, Pandora and Reddit. Depending on configurations of the social networks, nature of the transaction and characteristics of the user, the user may be required to authenticate him/herself on the social networks or otherwise give permission to the social networks in order for the social network interfaces 112 of social network information collection engine 110 to have access to and capture relevant data from the social networks. The social network interfaces 112 then harvests the social network information of the user from these social networks via automated visits to publicly available web pages of the social networks, or via public and private APIs provided for data access to the social networks. Once the social network information of the user is captured from the social networks via social network interfaces 112, the social network information collection engine 110 stores the collected data in social network information database 114 in a granular way. When requested, the social network information collection engine 110 provides the social network information of the user to user identity validation engine 120 for risk analysis of the transaction requested by the user.

In the example of FIG. 1, the user identity validation engine 120 verifies the validity of a user's identity and trustworthiness and calculate a risk score for the transaction requested by the user via risk analysis component 124. To the end, the user identity validation engine 120 relies upon data from one or more of: social network information of the user from social network information database 114, profiling information (profile) of the user from user database 118, which is created and maintained by profiling component 122, and past transaction history of the user from transaction component 124. If the user's identity is verified and the transaction is approved based on the risk score, the transaction component 124 automatically proceeds to process the transaction. Otherwise, the risk analysis component 124 may request additional information from the user and/or provide relevant information to a risk agent to review and make further decisions through the user interaction engine 102. The status of the transaction and/or the processing result are also provided back to the user via the user interaction engine 102.

In some embodiments, the profiling component 122 of the user identity validation engine 120 creates the profile of the user based on his/her social network information data in addition to profiling data solicited and provided by the user him/herself via the user interaction engine 102. Here, the profile of the user includes at least one or more of: name, address, date of birth (age), gender, and other identifying or classifying information of the user. Specifically, the social network information used by the profiling component 122 for profiling may include data on the user's activities activity and connections on the social networks as discussed below. For non-limiting examples, by checking the location of a user's posts, which is provided by many social networks), and information of the user's friends (e.g., who they are and where they leave), the profiling component 122 can "profile" the user to determine, for example, whether the user is a 13 year old or 15 year old, where the user is someone living in Europe or in US, etc. The profiling component 122 then matches the profile information gathered from the social network information of the user with the profiling data provided directly by the user to verify the authenticity of the user's profiling data and generate an accurate profile of the user. Once the user's profile is generated, it can be utilized by the user identity validation engine 120 to run traditional rick analysis in addition to the risk analysis based directly on social network information of the user as discussed below.

Certain user profiling data in real life (e.g. user's home address) has been used for traditional risk analysis (e.g., risk score based on zip codes). Until recently, however, identification of a user on the web, such as email address, username or <<screen name>>, are mostly unverified and creating new and/or fake accounts online is trivial. As the web has become more social and more and more web applications increasingly rely upon user's canonical identities (e.g., Facebook Connect), a user's identities on the social networks have gained a higher degree of trustworthiness versus anonymous usernames and unverified email addresses.

In some embodiments, risk analysis component 124 of the user identity validation engine 120 utilizes one or more of the following three types of social network information of user for risk analysis (more specifically, risk score calculation):
1) User account data on the social networks (when user account was created, where user lives, what is user's phone number, . . . )
2) User activity data on the social networks (user posts or tweets or . . . )
3) User connection data on the social networks, a.k.a., social graph (whom user is friend with or follows, when the connection was established, what is the type of the connection, etc.)

User Account "Age" (When the Account was Created)

In some embodiments, risk analysis component 124 utilizes the "age" of a particular identity of the user on a social network to determine its trustworthiness for risk analysis of the user. Fraudsters rarely use their "real" social network identity when committing fraud. Instead, they create new accounts on the social networks for an one-time use to perform a particular fraud. It has been found that most of the fraudsters' accounts are very "young" and usually are created only days if not hours before attempting the fraud. Although such behavior by the fraudsters complicates the process of using information of a known fraudulent account to identify potentially fraudulent payments, it enables a simple check of the user's identity by risk analysis component 124 based on the user's account "age" (time since the account was created)—the older the age of the identity, the more trustworthiness of the identity.

User Account Activities

In some embodiments, risk analysis component 124 utilizes activity information of a particular identity of a user on a social network to determine its trustworthiness for risk analysis of the user. Typical user accounts in social network are created for the purpose of data sharing, such as user posts, status updates, shared links, shared photos/videos, etc. fraudulent accounts, on the other hand, are created for the sole purpose perform a fraud and the fraudster behind these accounts are not interested in investing time and resources to share data with others. Since creating a new, trustworthy identity is extremely difficult, a fraudster may be forced to also compromise or steal a true person's online identity in addition to their financial information. Since stolen identities and financial information have a relatively short useful life, it is difficult for the fraudster to be active for a long period of time (after the account was compromised). As a result, fraudster accounts (either newly created or stolen by fraudsters from real users) have no or almost no user activities most of the time. In some embodiments, risk analysis component 124 may utilize information on the distribution of the user's activities over time as another indicator of identity fraud. Typical users have their activities (e.g., posts) evenly distributed along the time since the account was created, while fraudster accounts typically have big gaps in the activity.

User Connection Data

Figure 2:
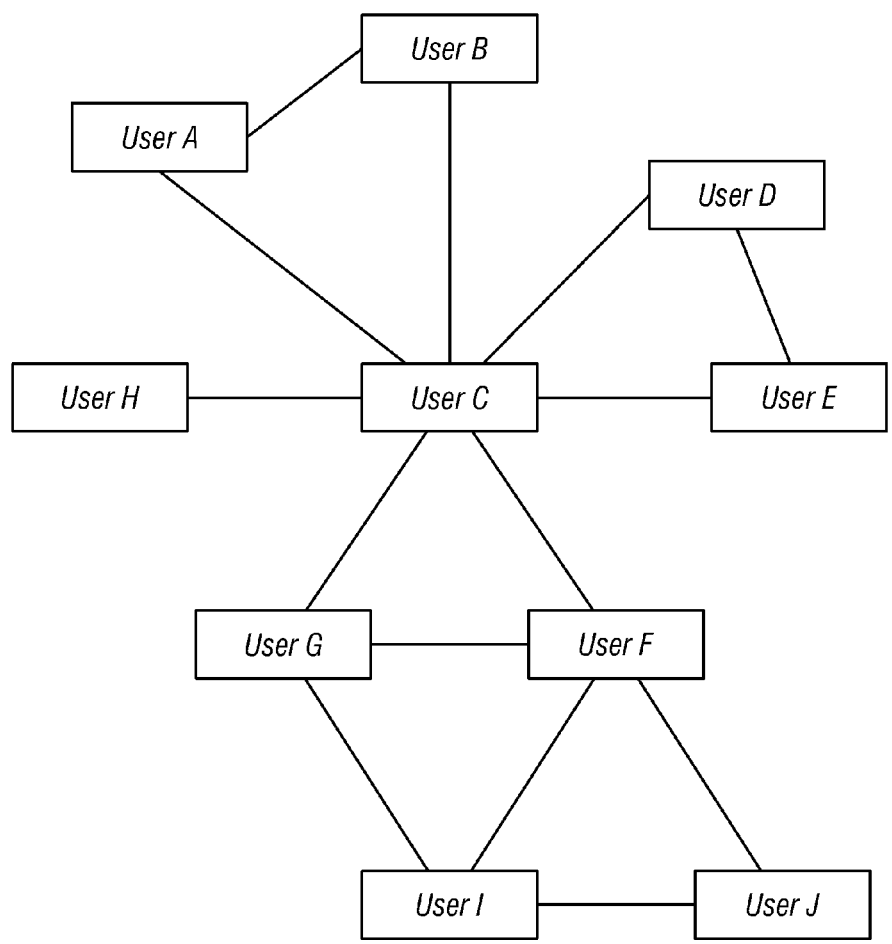
FIG. 2 depicts an example of a social graph.

In some embodiments, the social network information of the user includes a social graph, which is a massively interconnected web of relationships of the user with respect to other users on a social network. FIG. 2 depicts an example of a social graph. The nodes in the social graph represent users, while edges represent friendships or other connections among the users, including but not limited to, liking, commenting, messaging or tagging. These edges pass trust among the users along the graph. For a non-limiting examples, a user with one or more connections, e.g., trusted friends, can be trusted as a non-fraudster more than a user with no trusted friends; and a user with many connections can be trusted more than one with few or no long term connections.

In some embodiments, risk analysis component 124 utilizes and analyzes relationships and connections among nodes in one or more social graphs of a user for enhanced identity verification and risk analysis of the user. It is likely that a user will have a similar set of relationships across multiple web presences and social networks, and a lack of overlap or absence of data among the user's social graphs on multiple social networks can be used by the risk analysis component 124 to recognize a fraudulent user. Additionally, connections in a social graph such as "friendships" require the approval of a second party and a typical user accumulates hundreds of these connections from other individuals whom he/she know personally. A connection to a node that is known to be trusted (because of a previous relationship with that node) can also be relied upon to trust an unknown node.

In some embodiments, risk analysis component 124 checks the number of connections of a user in one of his/her social graphs for identity verification of the user. Since many fake or fraudster accounts are created for the sole purpose of committing fraud, they would typically demonstrate patterns that include but are not limited to, no connections, fragmented connections with no pattern, a large number of recent new connections with little or no past connections, or connections to other nodes that have suspicious patterns as well.

In some embodiments, risk analysis component 124 checks the user's connections with known fraudsters or known legit identities on one of the social graphs to determine the validity of a specific identity of the user. When a fraudster is trying to make his or her account to look "real", he or she can "friend" or "follow" only other accounts under his/her control. Thus, a known fraudster account casts a "shadow" to all the accounts it is connected to directly or indirectly. However, the risk decreases with the distance from the known fraudster account. Similarly, a known "good" account in the user's social graph greatly improves the odds of this account being legitimate, and the "distance" between a known legitimate account and the user also plays a big role. It may also happen that a user belongs to an extended network for one or more "known fraud" users as well as one or more extended networks of "known legit" users in the social graph. To determine the fraud probability in this case, risk analysis component 124 may determine the "fraud" probability based on the "fraud" probabilities in relation to individual known "fraud" or "legit" account based on statistical modeling and formulas.

In some embodiments, risk analysis component 124 checks the connections between the two parties involved in the financial transaction on the social graphs for risk analysis of the transaction. If both parties to the transaction can be found in the same social graph, risk analysis component 124 can then check the "distance" between them and figure out if these two parties are connected in real life or not. Although a fraud payer and/or a fraud payee might also be connected in the graph, the short "distance" between the payer and payee provides and strengthens either the "fraud" or "legit" indication.

In some embodiments, risk analysis component 124 utilizes the "age" of connections of an identity of a user on a social network to determine the trustworthiness and validity of the identity of the user. Similar to the "age" of the user account, the age of a connection is the time when the connection is established. The older the connections, the stronger the "fraud" or "legit" bias is. Note that different social networks have different "strengths" of the account connections. For non-limiting examples, connected users in Facebook most often know each other personally, while connected users in Twitter typically follow large number of users they never met. Thus, the social graph from Facebook or LinkedIn is much stronger indicator of risk than the social graph from Twitter or Google+.

Figure 3:
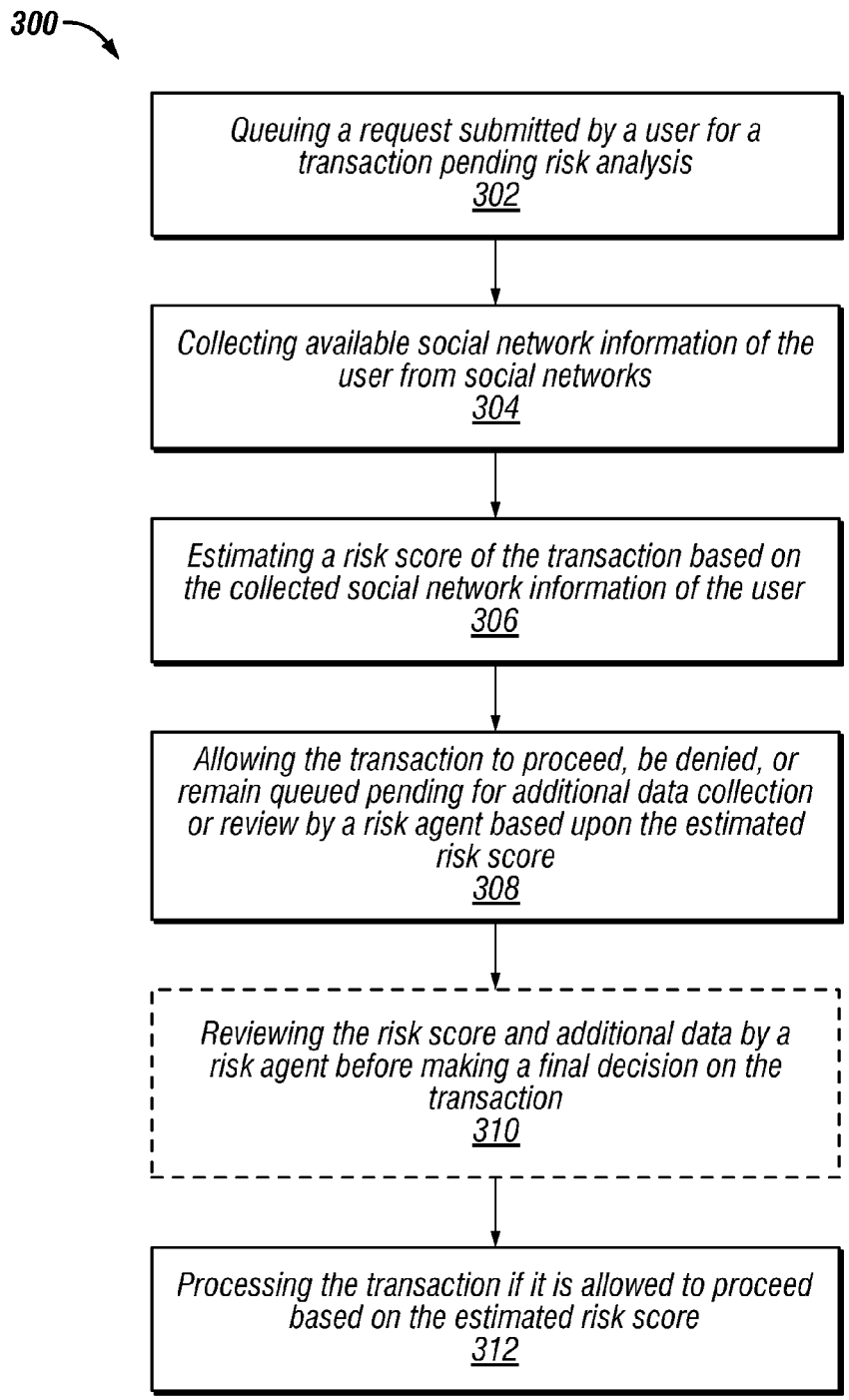
FIG. 3 depicts a flowchart of an example of a process to support user identity verification based on the social network information of the user.

FIG. 3 depicts a flowchart of an example of a process to support user identity verification based on the social network information of the user. Although this figure depicts functional steps in a particular order for purposes of illustration, the process is not limited to any particular order or arrangement of steps. One skilled in the relevant art will appreciate that the various steps portrayed in this figure could be omitted, rearranged, combined and/or adapted in various ways.

In the example of FIG. 3, the flowchart 300 starts at block 302 where a request submitted by a user for a transaction is queued pending risk analysis. The flowchart 300 continues to block 304, where available social network information of the user is collected from social networks. The flowchart 300 continues to block 306, where a risk score of the transaction is estimated based on the collected social network information as well as other data of the user. The flowchart 300 continues to block 308 where the transaction is allowed to proceed, is denied, or remains queued pending for additional data collection or review by a risk agent based upon the estimated risk score. Optionally, the flowchart 300 continues to block 310 where the risk score and additional data are reviewed by a risk agent before making a final decision on the transaction. The flowchart 300 end at block 312 where the transaction is processed if it is allowed to continue based on the estimated risk score.

Figure 4:
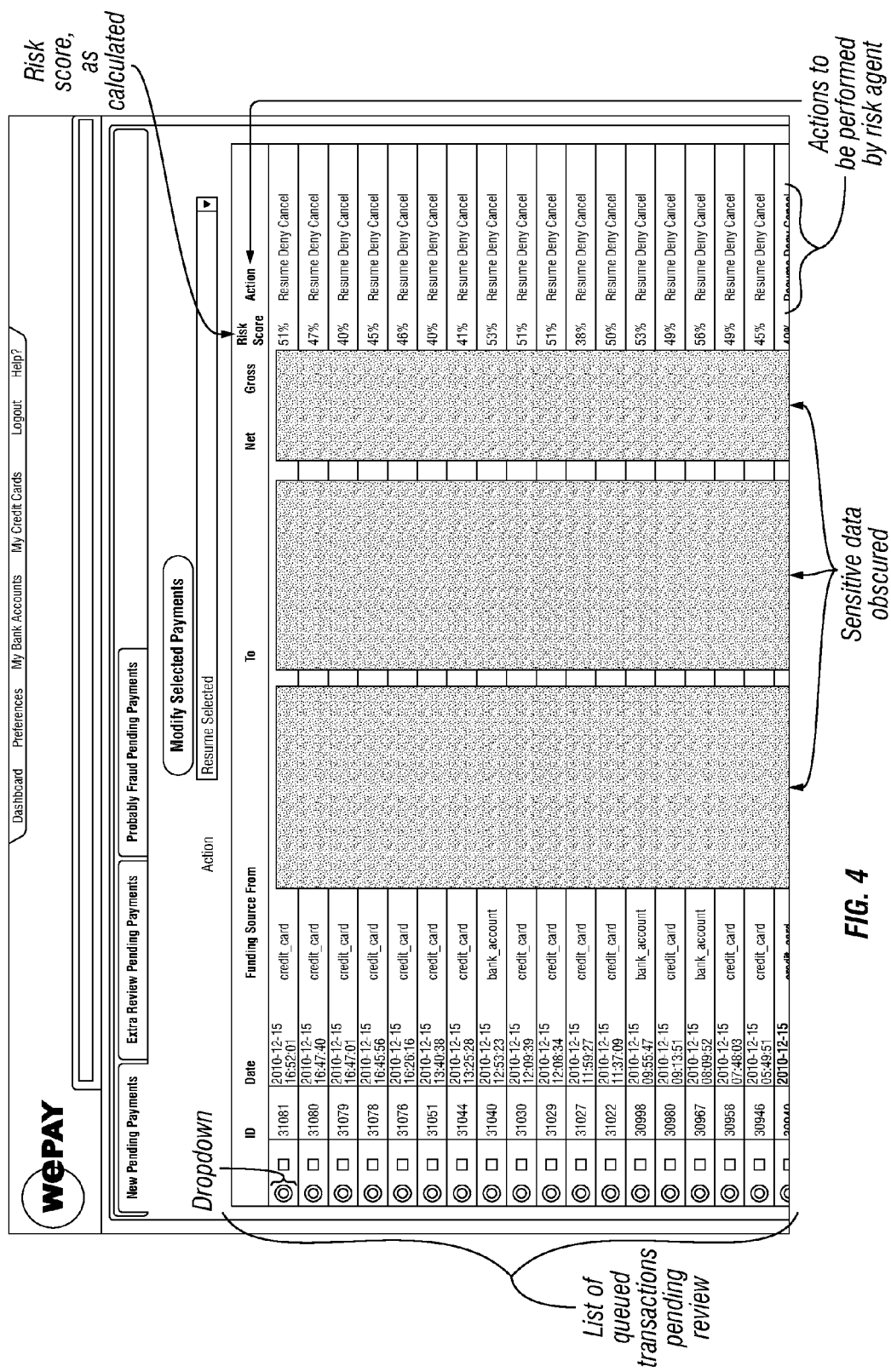
FIG. 4 depicts an example of risk analysis for requested transactions by the users.

FIG. 4 depicts an example of risk analysis for requested transactions by the users. In the example depicted in FIG. 4, the transactions requested by the users are queued for identity verification and risk analysis with sensitive data of the transactions obscured. A dropdown on the left side of the queue provides more information about each of the transactions when needed. Risk scores and other relevant data of the queued transactions are listed for a risk agent to make a decision and perform an action of resume (to processing) or deny.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a machine readable medium (media) having instructions stored thereon/in which can be used to program one or more hosts to perform any of the features presented herein. The machine readable medium can include, but is not limited to, one or more types of disks including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Stored on any one of the computer readable medium (media), the present invention includes software for controlling both the hardware of the general purpose/specialized computer or microprocessor, and for enabling the computer or microprocessor to interact with a human viewer or other mechanism utilizing the results of the present invention. Such software may include, but is not limited to, device drivers, operating systems, execution environments/containers, and applications.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Particularly, while the concept "interface" is used in the embodiments of the systems and methods described above, it will be evident that such concept can be interchangeably used with equivalent software concepts such as, class, method, type, module, component, bean, module, object model, process, thread, and other suitable concepts. While the concept "component" is used in the embodiments of the systems and methods described above, it will be evident that such concept can be interchangeably used with equivalent concepts such as, class, method, type, interface, module, object model, and other suitable concepts. Embodiments were chosen and described in order to best describe the principles of the invention and its practical application, thereby enabling others skilled in the relevant art to understand the claimed subject matter, the various embodiments and with various modifications that are suited to the particular use contemplated.

What is claimed is:

1. A system, comprising:
   a hosting device;
   a user interaction engine, which in operation, enables a user to submit a request for a transaction;
   a social network information collection engine, which in operation, collects available social network information of the user from one or more social networks;
   a user identity validation engine, which in operation,
   utilizes and analyses relationships and connections among nodes in one or more social graphs of the user for identity verification and risk analysis of the user, wherein each of the social graphs is an interconnected web of relationships of the user with respect to one user on one of the social networks;
   estimates a risk score of the transaction based on a pattern of distribution of online posts and shared contents by a particular identity of the user over time on one of the social networks, wherein uneven distribution and gaps in the pattern of distribution of the online posts and shared contents by the particular identity of the user over time on the social network indicate identity fraud by the user;
   allows the transaction to proceed, be denied, or remain queued based upon the estimated risk score;
   processes the transaction if it is allowed to proceed.

2. The system of claim 1, wherein
   the user interaction engine present to the user status of the request and/or processing result of the transaction.

3. The system of claim 1, wherein:
the user interaction engine enables a risk assessment agent to access information of the user and/or request additional information from the user to determine whether the transaction requested should be granted or denied.

4. The system of claim 1, wherein:
the social network information collection engine collects available social network information of the user from the social networks upon user authentication and/or permission.

5. The system of claim 1, wherein:
the social network information collection engine collects available social network information of the user from the social networks via automated visits to publicly available web pages of the social networks.

6. The system of claim 1, wherein:
the social network information collection engine collects available social network information of the user from the social networks via public and private Application Programming Interfaces (APIs) provided for data access to the social networks.

7. The system of claim 1, wherein:
the user identity validation engine verifies validity of the user's identity and trustworthiness based on one or more of: social network information of the user, profile of the user, and past transaction history of the user.

8. The system of claim 7, wherein:
the user identify validation engine creates the profile of the user based on his/her social network information data in addition to profiling data of the user.

9. The system of claim 1, wherein:
the user identity validation engine utilizes information on when a particular identity of the user is created on one of the social networks to determine its trustworthiness for risk analysis of the user.

10. The system of claim 1, wherein:
the user identity validation engine checks the number of connections of a user in one of the social graphs for identity verification of the user.

11. The system of claim 1, wherein:
the user identity validation engine checks the user's connections with known fraudsters or known legit identities on one of the social graphs to determine the validity of a specific identity of the user.

12. The system of claim 1, wherein:
the user identity validation engine checks connections between the two parties involved in the financial transaction on the social graphs for risk analysis of the transaction.

13. The system of claim 1, wherein:
the user identity validation engine utilizes information on the time when the connections of an identify of the user are established on the social graphs to determine the trustworthiness and validity of the identity of the user.

14. A method, comprising:
accepting and queuing a request submitted by a user for a transaction pending risk analysis by a hosting device;
collecting available social network information of the user from one or more social networks;
utilizing and analyzing relationships and connections among nodes in on or more social graphs of the user for identity verification and risk analysis of the user, wherein each of the social graphs is an interconnected web of relationships of the user with respect to other users on one of the social networks;
estimating a risk score of the transaction based on a pattern of distribution of online posts and shared contents by a particular identity of the user over time on one of the social networks, wherein uneven distribution and gaps in the pattern of distribution of the online posts and shared contents by the particular identity of the user over time on the social network indicate identity fraud by the user;
allowing the transaction to proceed, be denied, or remain queued pending for additional data collection or review by a risk agent based upon the estimated risk score;
processing the transaction if it is allowed to proceed.

15. The method of claim 14, further comprising:
presenting to the user status of the request and/or processing result of the transaction.

16. The method of claim 14, further comprising:
enabling a risk assessment agent to access information of the user and/or request additional information from the user to determine whether the transaction requested should be granted or denied.

17. The method of claim 14, further comprising:
collecting available social network information of the user from the social networks via automated visits to publicly available web pages of the social networks.

18. The method of claim 14, further comprising:
collecting available social network information of the user from the social networks upon user authentication and/or permission.

19. The method of claim 14, further comprising:
collecting available social network information of the user from the social networks via public and private Application Programming Interfaces (APIs) provided for data access to the social networks.

20. The method of claim 14, further comprising:
verifying validity of the user's identity and trustworthiness based on one or more of: social network information of the user, profile of the user, and past transaction history of the user.

21. The method of claim 20, further comprising:
creating the profile of the user based on his/her social network information data in addition to profiling data of the user.

22. The method of claim 14, further comprising:
utilizing information on when a particular identity of the user is created on one of the social networks to determine its trustworthiness for risk analysis of the user.

23. The method of claim 14, further comprising:
checking the number of connections of a user in one of the social graphs for identity verification of the user.

24. The method of claim 14, further comprising:
checking the user's connections with known fraudsters or known legit identities on one of the social graphs to determine the validity of a specific identity of the user.

25. The method of claim 14, further comprising:
checking connections between the two parties involved in the financial transaction on the social graphs for risk analysis of the transaction.

26. The method of claim 14, further comprising:
Utilizing information on the time when the connections of an identify of the user are established on the social graphs to determine the trustworthiness and validity of the identity of the user.

27. A non-transitory computer readable storage medium having software instructions stored thereon that when executed cause a system to:
accept and queue a request submitted by a user for a transaction pending risk analysis;
collect available social network information of the user from one or more social networks;

utilize and analyze relationships and connections among nodes in one or more social graphs of the user for identity verification and risk analysis of the user, wherein each of the social graphs is an interconnected web of relationships of the user with respect to one user on one of the social networks;

estimate a risk score of the transaction based on a pattern of distribution of online posts and shared contents by a particular identity of the user over time on one of the social networks to, wherein uneven distribution and gaps in the pattern of distribution of the online posts and shared contents by the particular identity of the user over time on the social network indicate identity fraud by the user;

allow the transaction to proceed, be denied, or remain queued pending for additional data collection or review by a risk agent based upon the estimated risk score;

process the transaction if it is allowed to proceed.

* * * * *